July 14, 1936.  J. C. HEINTZ  2,047,684

TIRE RETREADING METHOD

Filed June 20, 1935

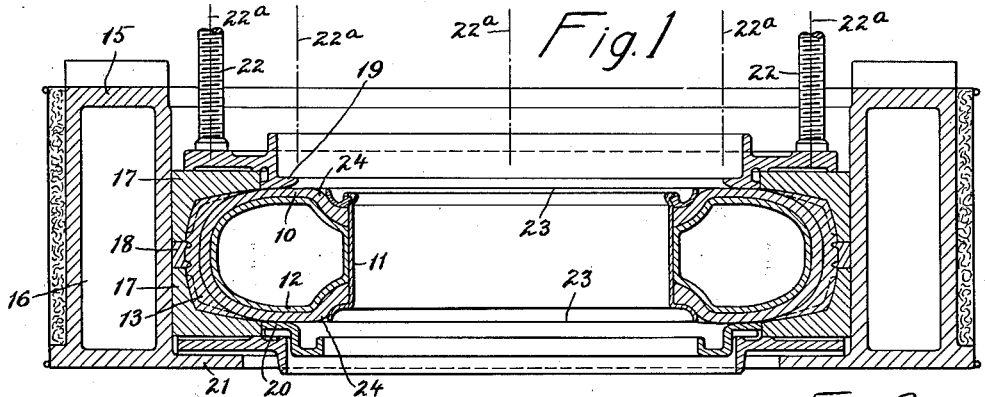

Fig.1

| A | B | C | D | E | F | G | H | |
|---|---|---|---|---|---|---|---|---|
| MOLD NO. | MATRIX NO. | SPACER NO. | TIRE SIZE | RIM SIZE | CAMEL-BACK | MATRIX LIMITS | AIR BAG PRESSURE | SIDEWALL RING NO. |
| 3250 | 3284 | 3284-A | 5.00-17 | 17x4½ | FA | 62⅛"-64⅜" | 100# | |
| | | | 5.25-17 | 17x4½ | FA | | " | |
| | | 3284-B | 6.00-16 | 16x4½ | FB | 62⅝"-64⅞" | " | 32275 |
| | | 3284-C | 5.50-17 | 17x4½ | FC | 63⅝"-65⅝" | " | |
| | | | 6.25-16 | 16x4½ | | | " | |
| | | 3294-A | 4.50-20 | 20x4 | FA | 64⅛"-66⅜" | " | |
| | | | 4.75-19 | 19x4 | | | " | |
| | 3204 | 3204-B | 5.00-20 | 20x4 | FB | 66⅝"-68⅝" | " | 32475 OR 32476 |
| | | | 5.50-19 | 19x4 | | | " | |
| | | 3204-C | 6.00-18 | 18x4½ | FC | 67⅝"-69⅞" | " | |
| | | | 6.50-17 | 17x4½ | | | " | 32476 |
| | | | 7.00-16 | 16x4½ | | | " | |
| | | | 7.50-15 | 15x4½ | | | " | 32476 |

Fig.2

| RECOMMENDED CAMELBACK DIMENSIONS | | | |
|---|---|---|---|
| CAMEL-BACK | OVERALL WIDTH | HUMP WIDTH | GAUGE AT CENTER |
| FA | 6¼" | 3⅞" | 12"/32 |
| FB | 6¼" | 4⅝" | 12"/32 |
| FC | 7" | 4⅝" | 14"/32 |
| FD | 7½" | 4⅞" | 16"/32 |
| HG | 7⅞" | 4⅜" | 15"/32 5" BREAKER |
| HH | 8½" | 4¾" | 16"/32 5" BREAKER |
| RHI | 9" | 5½" | 16"/32 6½" BREAKER |

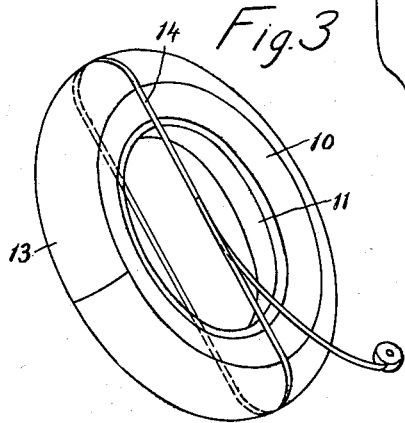

Fig.3

Inventor,
J. C. Heintz,
By Robert M. Pierson,
Attorney

Patented July 14, 1936

2,047,684

UNITED STATES PATENT OFFICE 2,047,684

TIRE RETREADING METHOD

James C. Heintz, Lakewood, Ohio

Application June 20, 1935, Serial No. 27,513

5 Claims. (Cl. 18—18)

This invention, which relates to full-circle retreading of pneumatic tires, has among its objects to save time and labor in selecting the proper size of vulcanizing mold cavity for the reception of a particular tire to be retreaded, to reduce the amount of equipment required to handle the different sizes of tires, to avoid the complication and expense of a vulcanizer having adjustable width-varying means, to insure the proper performance of the retreading operation without producing defects such as buckling of the tire walls from using a mold whose cavity is too small for the tire, or obtaining spongy treads by using too large a mold cavity, to dispense with the necessity for special measuring devices, and to simplify and reduce the number of tabular instruction charts furnished by the equipment manufacturer to be consulted by the operator in selecting a mold having the proper size cavity.

The performance of my improved method in connection with one type of retreading vulcanizer and instruction chart is illustrated in the accompanying drawing wherein Fig. 1 is a diametric section of the retreading vulcanizer, with parts omitted, and a tire therein.

Fig. 2 is a fragmental view of the preferred form of tabular instruction chart.

Fig. 3 is a perspective view of a tire and measuring tape illustrating the performance of the measuring step.

It is well known that used pneumatic tires of any given nominal size which may have been originally of substantially the same dimensions will, through variations of stretch in service, acquire more or less growth and become of different sizes, while some of them may not grow appreciably before the original tread wears off or has become so injured as to require replacement. Obviously, the best retreading results cannot be obtained where it is attempted to use a single retreading mold of fixed size completely enclosing the cross section of the tire, for any given nominal size, like that in which the tire was originally vulcanized; and furthermore, to heat the side walls of the tire to a vulcanizing temperature where not protected by the new tread tends to overcure and injure the side walls.

These facts have led to the adoption of full-circle retreading molds such as that described in my Patent No. 1,810,963 of June 23, 1931, wherein the walls of the mold cavity embrace only the tread and a portion of the side walls of an inflated, rim-mounted tire, annular side portions of the tire-contacting cavity walls are left relatively cool, the base portions of the tire walls are left free to bulge more or less, and tread-matrix portions of the cavity walls are made in sections and adapted to be replaced in the same heating-jacket holder by others of different cavity dimensions. Such a vulcanizer, largely by reason of the permitted bulging of the unconfined portions of the tire walls, will usually accommodate, in one properly selected mold cavity of fixed size, all of the variations in dimensions of any given rated size of tire, and frequently also in the same cavity will accommodate from two up to five different rated sizes and their several growth variations. By changing matrices or portions thereof, as by using spacer rings of different widths, where there is not too much variation in the tread diameter, the same vulcanizer can further be accommodated to an additional range of tire sizes. The flexibility of such equipment reduces the operator's investment in mold equipment required to handle the large number of tire sizes and tread designs met with in the retreading business.

My present invention can be carried out with that type of vulcanizer and with many similar or other types, particularly where they permit free bulging of the base portions of the tire walls.

In the use of such equipment as heretofore practiced, I have found that while an experienced operator may, with smaller or medium-sized passenger-car tires, learn to rate the size of a tire which may properly be retreaded in a particular size of mold, this is very difficult in the larger sizes of both those and bus and truck tires where comparatively large dimensional variations may escape accurate estimation, and even a skilled operator may sometimes lose a tire by a wrong estimation or making improper or insufficient measurements.

My present invention provides an improved method, including a new form of tire measurement and a new mode of predetermining the relation thereto, within certain permitted limits of tire-size variation, of a full-circle retread mold cavity of fixed size, whereby the personal factor of the operator is practically eliminated, tabulation charts and measurements are simplified and the operator may, by carrying out a series of simple steps according to the instructions furnished, insure himself completely against loss of tires by failure to fit them in the proper molds.

In the drawing, 10 is the tire casing to be retreaded, the same being mounted on a road rim

2
2,047,684

11, together with an inflatable inner curing tube 12, and having a raw rubber tread 13 cemented upon its carcass from which the remains of the old tread have been removed. The new tread strip material is known as "camelback", and the proper dimensions of strip to give the desired width and thickness of vulcanized retread should be known to the operator and may be selected with the aid of a suitable instruction table. 14 is an ordinary non-stretchable measuring tape employed as hereinafter pointed out.

The full-circle vulcanizer shown in Fig. 1 comprises a horizontal annular holder 15 having a peripheral chamber 16 for containing a heating fluid such as steam, a cylindrical inner chamber wall for transmitting the heat to the segmental side matrix rings 17 and the segmental middle or spacer ring 18 which collectively constitute the tread-molding portion of the mold, a pair of continuous upper and lower side-wall rings 19, 20 which are slightly spaced from the inner margins of the matrix rings 17 and maintained below a vulcanizing temperature, and a lower shelf 21 for supporting the mold, together with a series of vertical screw clamps 22 at spaced positions 22ª, carried by removable holders (not shown) on the upper side of the chamber 16 and bearing on the upper side-wall ring 19 for holding the assembly of mold rings down against the lower shelf.

The several matrix, spacer and side-wall rings define a mold cavity of fixed dimensions whose parallel tire side-wall contacting portions on the rings 19 and 20 are maintained in alignment or proper contouring registry with the adjacent marginal molding portions of the matrix rings 17, and in tangent or parallel relation with the tire sides when in the mold. The included fixed diametric periphery or solid contour of the molding cavity and central space as a whole is then defined in a radial plane by the inner faces of the mold rings and by the parallel spanning lines 23, continuing the side-wall tangents from the inner faces of the rings 19 and 20 across the intervening central space. From this dimension there is omitted the changeable contour of the free base portions 24 of the tire side walls between the rim 11 and the rings 19 and 20, which provide bulges in said side walls, giving or taking more or less of the total cross-sectional volume of the inflated tire according as said volume may vary in the particular tire with relation to the size of the confining mold cavity.

By having this included mold-cavity periphery predetermined and recorded and properly related to a corresponding diametric peripheral measurement taken on the tire to be vulcanized in the mold, the operator is enabled unfailingly to select the size of mold cavity which will properly fit the particular tire or other tires of different sizes within a permitted range of variation.

Fig. 2 shows a portion of a tabulation chart furnished to the operator by the manufacturer of the vulcanizing equipment as an aid in carrying out this invention. Within its vertical height and its several columns it may contain all of the several tire and rim sizes used on passenger cars, for example, or on truck tires, which the repair man or tire manufacturer will be called upon to treat, together with equipment maker's numbers or other symbols for identifying the sizes of vulcanizer, size or type of matrix, spacer and sidewall rings, and size or shape of tread material for the several tires, and a column of matrix limits stating the range of diametric peripheral measurements of tires to fit a given mold cavity, together with other columns identifying the proper air bags and giving the air bag pressure and curing time, appropriate instructions for using the chart and performing the method and an illustration of the tire-measuring step. Two charts, respectively for passenger-car and truck tires, each chart measuring about 16 x 21 inches, will fill all requirements, or the information for both classes of tires may be placed on a single chart of somewhat larger size.

For example, column A headed "Mold No." may identify three vulcanizer sizes for handling the whole range of passenger-car tires, and each such size will have two or three sizes or types of the matrix rings 17 identified in column B entitled "Matrix No." Column C, "Spacer No." identifies the proper spacers 18, each corresponding to one or more tire sizes. Column D is for the "Tire size", column E for the "Rim size", column F for "Camel-back" or tread 13, column G for "Matrix limits" and column H for "Sidewall ring No." 19 or 20.

The significant limits of tire dimensions pertaining to this method are found in column G, "Matrix limits" wherein, for example, the limits 63⅝"-65⅝" are marked opposite the two tire sizes 5.50—17 and 6.25—16. This means that any tire of rated 5.50 inch width and 17 inch bead-seat diameter, or any tire of rated 6.25 inch width and 16 inch bead-seat diameter, having an included diametric peripheral measurement of not less than 63⅝ inches and not more than 65⅝ inches will properly fit the mold cavity provided by the matrix rings, spacer ring and side-wall rings which are identified in the other columns opposite these tire sizes. If the tire dimension is greater than the upper limit, the cavity width should be increased by using a wider spacer ring 18, or wider matrix rings 17, and vice versa for a dimension smaller than the lower limit, as will be directed by proper instructions on the chart. In like manner the proper limits will be allotted to each set of cavity-defining rings for the other tire sizes, where in some cases there will be only one set of limits for one tire size and in others sometimes as many as five tire sizes, all for one mold cavity. These "Matrix limits" given in column G are predetermined by the maker of the vulcanizing equipment, from trials of the various actual sizes of tires which can properly be accommodated in each of the various mold-cavity sizes, consistently with good retreading results, using tread material of a size and shape given in column F. The chart table 25 gives the recommended dimensions of camelback or tread material corresponding to the several letter symbols in this column.

In practicing this method in its preferred form, a rim-mounted tire bearing a raw tread of the proper volume is inflated to a given pressure such as 25 pounds per square inch, and with the steel tape 14 its included diametric peripheral measurement is taken around the tread and along lines tangent to the side walls as shown in Fig. 3. The tire is then fitted in a mold having a cavity whose matrix limit dimensions given in column G of the chart include this dimension of the tire, it is inflated to the proper curing pressure such as 100 pounds for passenger-car or 150 to 200 pounds for truck tires, and vulcanization of the tread proceeded with as previously indicated and as described in my Patent 1,810,963.

Some of the steps in the complete method as thus described may be more or less varied. For example, the tire could be measured, somewhat less accurately, without a rim and without inflation. It could also be measured diametrically around the crown of a stripped carcass without the tread, substantially in the manner described for the tread-bearing tire, either with or without rim-mounting and inflation, and the limit dimensions given in column G of the chart correspondingly changed, if the operator were then sufficiently careful in his selection of the proper tread. It is also to be understood that while a preferred form of mold has been illustrated and described, the invention, broadly considered, may be practiced with any suitable mold.

It is found that this method will afford proper retreading in practically all cases, the results are superior to those of methods involving the measurement of the tire-wall sectional contour from bead to bead and adjustment of the size of the mold cavity after the tire is fitted therein, special measuring apparatus is dispensed with and it is unnecessary to have a chart for each make and size of tire.

I claim:

1. The method of fitting a pneumatic tire to a retread vulcanizing mold which comprises diametrically measuring the tire periphery around the crown thereof and along parallel lines bridging its central space and tangent to the side walls, and placing it, with a raw tread thereon, in a full-circle vulcanizing mold having a tire-receiving space with a fixed transverse peripheral dimension which is within predetermined limits of variation of the measured tire periphery.

2. A method according to claim 1 in which the tire is measured with the raw tread thereon.

3. A method according to claim 1 in which the tire is measured when inflated on a rim and having a raw tread thereon.

4. The method of retreading a pneumatic tire which comprises rim-mounting and inflating the tire bearing the raw tread, diametrically measuring its included periphery around the tread and along side lines tangent to the side walls of the tire, placing it in a full-circle vulcanizing mold having a cavity with an included diametric periphery of a fixed dimension which is within predetermined limits of variation of the measured tire periphery, the walls of said cavity peripherally embracing the tire tread and tangently embracing its side walls, leaving the base portions of the side walls free to bulge, inflating the tire to a curing pressure in the mold, and vulcanizing the tread while the mold-embraced portions of the tire are held to the fixed dimensions of the mold cavity.

5. The method of fitting a pneumatic tire casing to a retread vulcanizing mold which comprises providing tire-confining and tread-molding sections adapted collectively to form a series of full-circle molding cavities of different capacities and fixed dimensions and each of a predetermined diametric peripheral dimension including tangent inner marginal side portions of fixed spacing adjacent to a central open space, fixing the cross-sectional dimension of the tire casing including its bead spacing and, while so fixed and by a single measurement, diametrically measuring the casing periphery around the crown thereof and along parallel lines bridging the central space and tangent to the side walls, selecting and combining appropriate mold sections to form a tire-confining and tread-molding cavity of fixed capacity whose corresponding measurement includes that of the tire casing within predetermined limits of variation of the latter, and placing said casing, with a raw tread thereon, in the molding cavity for vulcanizing said tread.

JAMES C. HEINTZ.